US012662054B2

(12) United States Patent
Govindarajan et al.

(10) Patent No.: US 12,662,054 B2
(45) Date of Patent: Jun. 23, 2026

(54) INTERACTIVE MULTI-DISPLAY SURROUNDING-VIEW SYSTEM FOR VEHICLE

(71) Applicant: Atieva, Inc., Newark, CA (US)

(72) Inventors: Nikhilesh Govindarajan, Fremont, CA (US); Shuo Yuan, San Jose, CA (US); William M. Johnson, Fremont, CA (US)

(73) Assignee: Atieva, Inc., Newark, CA (US)

( * ) Notice: Subject to any disclaimer, the term of this patent is extended or adjusted under 35 U.S.C. 154(b) by 134 days.

(21) Appl. No.: 18/700,158

(22) PCT Filed: Oct. 10, 2022

(86) PCT No.: PCT/US2022/077837
§ 371 (c)(1),
(2) Date: Apr. 10, 2024

(87) PCT Pub. No.: WO2023/064723
PCT Pub. Date: Apr. 20, 2023

(65) Prior Publication Data
US 2024/0399960 A1      Dec. 5, 2024

Related U.S. Application Data

(60) Provisional application No. 63/262,380, filed on Oct. 11, 2021.

(51) Int. Cl.
B60R 1/28 (2022.01)
G06F 3/04883 (2022.01)
(Continued)

(52) U.S. Cl.
CPC ............ B60R 1/28 (2022.01); G06F 3/04883 (2013.01); G06T 3/4038 (2013.01);
(Continued)

(58) Field of Classification Search
CPC ................ B60R 1/28; B60R 2300/303; B60R 2300/602; B60R 2300/607;
(Continued)

(56) References Cited

U.S. PATENT DOCUMENTS

2010/0020034 A1      1/2010   Kim
2015/0022664 A1      1/2015   Pflug et al.
(Continued)

OTHER PUBLICATIONS

"Mercedes S-Class 2021—Crazy 3D Parking surround system with 360° camera." https://www.youtube.com/watch?v=r8x0RrORMFg crospotter13. video, times 1:00-1:21. Feb. 2021. (Year: 2021).*
(Continued)

*Primary Examiner* — Farzana Hossain
(74) *Attorney, Agent, or Firm* — Brake Hughes Bellermann LLP

(57) ABSTRACT

Managing camera outputs in an interactive multi-display surrounding view system comprises: receiving outputs from at least four cameras of the vehicle; stitching together the outputs into a first image of a top-down view of vehicle surroundings; adding a three-dimensional (3D) model of the vehicle to the first image, based on the vehicle surroundings, to generate a first enhanced image; and simultaneously presenting (i) the first enhanced image on a first display device of the vehicle, the first display device providing a first touchscreen input control for a first aspect of the first enhanced image, and (ii) a second image on a second display device of the vehicle, the second image comprising one of the outputs, the second display device providing a second touchscreen input control for a second aspect of the second image, wherein the first and second touchscreen input controls accept inputs simultaneously and non-simultaneously with each other.

13 Claims, 14 Drawing Sheets

(51) Int. Cl.
    *G06T 3/4038*         (2024.01)
    *G06T 19/00*         (2011.01)

(52) U.S. Cl.
    CPC ...... *G06T 19/006* (2013.01); *B60R 2300/303*
        (2013.01); *B60R 2300/602* (2013.01); *B60R*
        *2300/607* (2013.01)

(58) Field of Classification Search
    CPC ........... B60R 2300/806; G06F 3/04883; G06F
        2203/04806; G06F 3/04847; G06F
        2203/04808; G06T 3/4038; G06T 19/006
    See application file for complete search history.

(56) References Cited

U.S. PATENT DOCUMENTS

| | | | | |
|---|---|---|---|---|
| 2019/0327415 | A1* | 10/2019 | Prabhakar | ............ H04N 23/667 |
| 2020/0081608 | A1 | 3/2020 | Yamamoto et al. | |
| 2020/0154091 | A1 | 5/2020 | Pflug | |
| 2020/0301579 | A1 | 9/2020 | Shaffer et al. | |
| 2020/0401818 | A1* | 12/2020 | Gibert Castroverde | ..................... |
| | | | | B60K 35/10 |
| 2021/0094473 | A1* | 4/2021 | Gali | .......................... B60R 1/26 |
| 2022/0317842 | A1* | 10/2022 | Kumakura | ............. B60K 35/29 |
| 2024/0064274 | A1* | 2/2024 | Blank | ....................... B60R 1/25 |
| 2024/0312153 | A1* | 9/2024 | Lee | .......................... G06F 9/543 |

OTHER PUBLICATIONS

2021 Mercedes-Benz S-Class: 360 Camera Overview (https://www.youtube.com/watch?v=dsuTNplrOPE. video times 0:43-1:00, Aug. 2021. (Year: 2021).*
2021_Mercedes_Benz_S_Class_360_Camera_Overview. (Year: 2021).*
Mercedes S-Class 2021 â Crazy 3D Parking surround system with 360 camera (Year: 2021).*
International Search Report and Written Opinion for PCT Application No. PCT/US2022/077837, mailed on Feb. 1, 2023, 9 pages.
"2021 Mercedes Benz E Class Surround View/360 Camera", Automotive Guru; retrieved from the internet <https://www.youtube.com/watch?v=nO4hdadM-Yw>; 2021, 1 page.
"2021 Mercedes-Benz S-Class: 360 Camera Overview", Mercedes-Benz of Naples; retrieved from the internet <https://www.youtube.com/watch?v=dsuTNplrOPE>; 2021, 1 page.
"Mercedes S-Class 2021—Crazy 3D Parking Surround System With 360 Camera", Crospotter 13; retrieved from the internet <https://www.youtube.com/watch?v=r8x0RrORMFg>; 2021, 1 page.
Extended European Search Report for European Application No. 22881933.0, mailed Jul. 15, 2025, 10 pages.

* cited by examiner

INTERACTIVE MULTI-DISPLAY SURROUNDING-VIEW SYSTEM FOR VEHICLE

CROSS-REFERENCE TO RELATED APPLICATION

This application is a 35 U.S.C. § 371 National Phase Entry Application from PCT Application No. PCT/US2022/077837, filed on Oct. 10, 2022, entitled "INTERACTIVE MULTI-DISPLAY SURROUNDING-VIEW SYSTEM FOR VEHICLE", and designating the U.S., which claims priority to U.S. Provisional Patent Application No. 63/262,380, filed on Oct. 11, 2021, and entitled "INTERACTIVE MULTI-DISPLAY SURROUNDING-VIEW SYSTEM FOR VEHICLE," the disclosures of which are incorporated by reference herein in their entireties.

TECHNICAL FIELD

This document relates to an interactive multi-display surrounding-view system for a vehicle.

BACKGROUND

In recent years, more vehicles come equipped with a camera to aid the driving. At first, a signal camera was typically mounted at the back of the vehicle and oriented rearward to aid the driver when going in reverse. More recent systems have used multiple cameras and may have been able to generate an artificial view of the vehicle from above. However, such systems typically lack certain interactivity and may not be flexible for use also in multi-display vehicles.

SUMMARY

In an aspect, a computer-based method of managing camera outputs in an interactive multi-display surrounding view system comprises: receiving, in an interactive multi-display surrounding-view system of a vehicle, outputs from at least four cameras of the vehicle; stitching together the outputs into a first image that shows a top-down view of vehicle surroundings; adding a three-dimensional (3 D) model of the vehicle to the first image, based on the vehicle surroundings, to generate a first enhanced image; and simultaneously presenting (i) the first enhanced image on a first display device of the vehicle, the first display device providing a first touchscreen input control for a first aspect of the first enhanced image, and (ii) a second image on a second display device of the vehicle, the second image comprising one of the outputs, the second display device providing a second touchscreen input control for a second aspect of the second image, wherein the first and second touchscreen input controls accept inputs simultaneously and non-simultaneously with each other.

Implementations can include any or all of the following features. The computer-based method further comprises receiving a first input made with the first touchscreen input control, and in response changing the first enhanced image from the top-down view to a perspective view of the vehicle surroundings and the 3 D model of the vehicle. The first input is made using a sweeping gesture detected by the first touchscreen input control. The first enhanced image presents multiple view presets, and wherein the first input involves the first touchscreen input control detecting a tap on one of the multiple view presets. The top-down view is a default view of the first enhanced image in the interactive multi-display surrounding-view system, the method further comprising receiving a second input made with the first touchscreen input control, and in response again presenting the default view on the first display device. The second input includes a five-finger pinch detected by the first touchscreen input control. The computer-based method further comprises receiving an input made with the first touchscreen input control, and in response changing a zoom level of the first enhanced image. The input includes a double tap detected by the first touchscreen input control. The input includes a pinch gesture detected by the first touchscreen input control. The computer-based method further comprises receiving an input made with the second touchscreen input control, and in response changing the second image to instead comprise another one of the outputs. The computer-based method further comprises receiving, in the interactive multi-display surrounding-view system, sensor output regarding presence of an obstacle in the vehicle surroundings, and in response (i) adding a first augmented reality (AR) object to the first enhanced image, and (ii) adding a second AR object to the second image, each of the first and second AR objects representing, and indicating a distance to, the obstacle. The computer-based method further comprises receiving input made with the first touchscreen input control, and in response rotating the top-down view into a perspective view of the vehicle surroundings and the 3 D model of the vehicle, including modifying the first AR object in the first enhanced image. The computer-based method further comprises receiving input made with the second touchscreen input control, and in response changing the second image to instead comprise another one of the outputs, including modifying the second AR object in the second image.

BRIEF DESCRIPTION OF DRAWINGS

Like reference symbols in the various drawings indicate like elements.

DETAILED DESCRIPTION

Figure 1A:
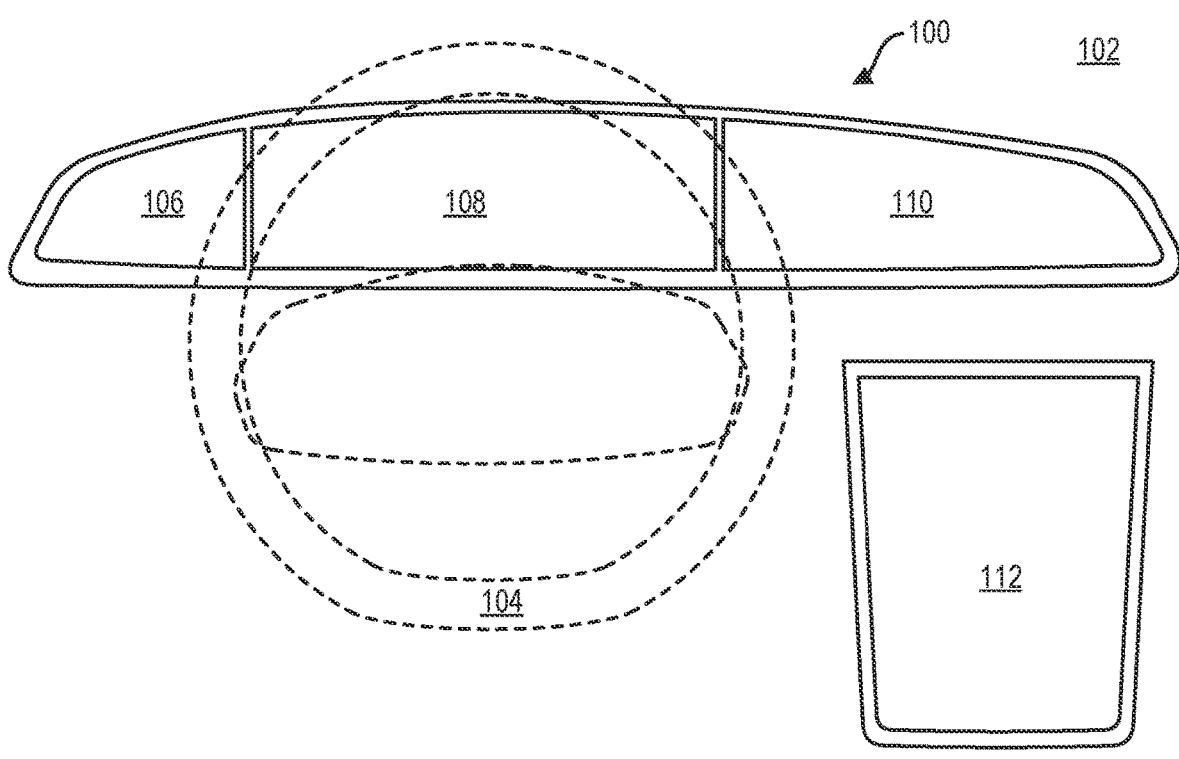
FIG. 1A shows an example of an instrument panel of a vehicle.

This document describes examples of systems and techniques for managing camera outputs in an interactive multi-display surrounding view system.

Examples described herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. A vehicle can be powered by one or more types of power sources. In some implementations, a vehicle is powered solely by electricity, or can use one or more other energy sources in addition to electricity, to name just a few examples.

Examples herein refer to display devices. A display device visually outputs a graphical user interface for one or more computer devices. A display device can operate according to any of multiple display technologies used for presenting computer-based information. A display device can include a liquid crystal display (LCD), a light-emitting diode (LED) display, and/or a plasma display, to name just a few examples. A display device can be configured for receiving input for the computer device(s). In some implementations, a display device can feature one or more types of technology for detecting contact with, or proximity to, the screen by a user's hand or an implement such as a stylus. A display device can operate according to any of multiple touch-detecting, or gesture-recognizing, technologies. A display device can include a resistive touchscreen, a capacitive touchscreen, and/or a touchscreen based on optical imaging, to name just a few examples. A display device can have any of multiple shapes. In some implementations, a display device has a quadrilateral shape (e.g., rectangular), or a non-polygonal shape, to name just a few examples. A display device can have a substantially flat form factor (e.g., the screen is essentially planar), or a non-flat form factor (e.g., the screen is curved according to one or more radiuses.) Two or more display devices can be positioned according to any of multiple spatial relationships with regard to each other. One display device can be placed substantially above another display device in a vertical direction. One display device can be placed substantially to the side of another display device in a horizontal direction. One display device can be placed diagonally from another display device in any direction. Two or more display devices can be positioned so as to face in a common direction. Two or more display devices can be positioned so as to face in different directions from each other.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., LiDAR); a radio-based sensor (e.g., radar); or an acoustic sensor (e.g., an ultrasonic device and/or a microphone).

FIG. 1A shows an example of an instrument panel 100 of a vehicle 102. The vehicle 102 is mostly omitted in the present illustrations for simplicity. The vehicle 102 includes a steering wheel 104 (here shown in phantom for clarity), that can be used in connection with, or independently of, one or more controls or functions available at the instrument panel 100. In some implementations, the steering wheel 104 can include one or more buttons, scroll wheels, or other controls by which the driver can make at least one input. The instrument panel 100 can be used in combination with one or more other examples described elsewhere herein.

The instrument panel 100 includes a display device 106 here positioned somewhat to the left of the steering wheel 104. The instrument panel 100 includes a display device 108 here positioned essentially behind the steering wheel 104. The instrument panel 100 includes a display device 110 here positioned somewhat to the right of the steering wheel 104. The display device 110 can be horizontally aligned with an instrument cluster in the vehicle 102. For example, the instrument cluster can include at least the display device 108. The instrument panel 100 includes a display device 112 here positioned lower than (e.g., essentially vertically below) the display device 110. The display device 112 is considered to be positioned in the instrument panel 100. For example, the display device 112 can be positioned lower in the same physical housing in which the display devices 106, 108, and 110 are mounted. As another example, the display device 112 can be mounted in a center console positioned between first-row seats in the vehicle 102, so as to be reachable by the driver (and optionally a first-row passenger). Each of the display devices 106, 108, 110, and 112 can output any type of content. For example, the image output(s) from one or more cameras of the vehicle 102, whether augmented, processed, or unaltered, can be output on any or all of the display devices 106, 108, 110, and 112.

Figure 1B:
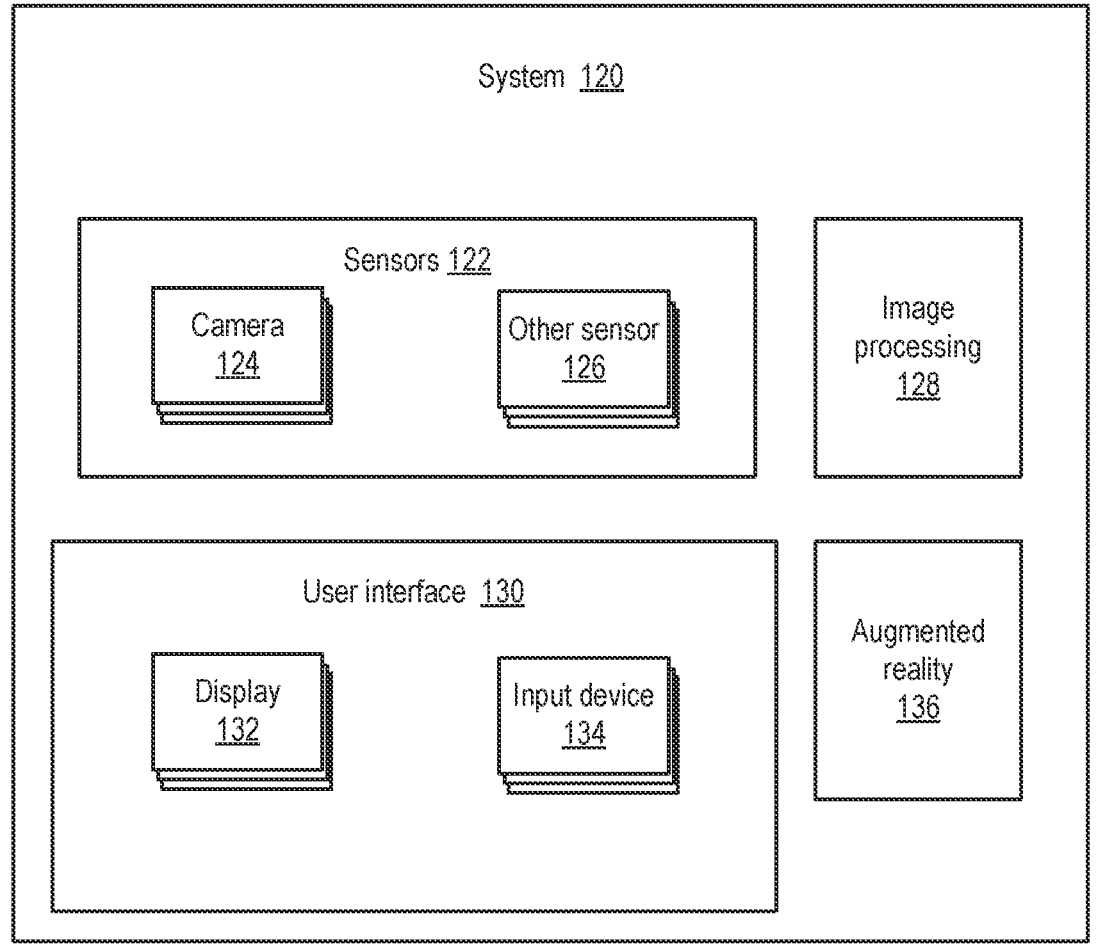
FIG. 1B shows a block diagram of an interactive multi-display surrounding-view system that can be used with a vehicle.

FIG. 1B shows a block diagram of an interactive multi-display surrounding-view system 120 that can be used with a vehicle. The system 120 is interactive, includes multiple displays, and provides at least a surrounding view of the vehicle. The system 120 can be used in combination with one or more other examples described elsewhere herein.

The system 120 can include sensors 122. The sensors 122 can include multiple cameras 124. The cameras 124 can be positioned on or within the vehicle and can capture internal and/or external views. In some implementations, four or more of the cameras 124 are aimed so as to capture vehicle surroundings (e.g., the ground and nearby areas in at least four directions from the vehicle). The sensors 122 can include one or more other sensors 126. In some implementations, the other sensor(s) 126 can generate sensor output regarding presence of an obstacle in the vehicle surroundings. For example, the sensor output can include information reflecting a distance from the obstacle to the vehicle (e.g., to a nearest portion of the vehicle).

The system 120 includes an image processing component 128 that receives at least output from the cameras 124. In some implementations, the image processing component 128 can stitch together (e.g., by way of digital image manipulation) output from multiple ones of the cameras 124 into a coherent image. For example, such stitching can generate a surrounding view of at least the vehicle surroundings.

The system 120 includes a user interface 130 that can include multiple display devices 132 and multiple input devices 134. The display devices 132 can correspond to some or all of the display devices 106, 108, 110, and 112 (FIG. 1A). The input devices 134 can be associated with one or more of the display devices 132, and/or can be separate therefrom. In some implementations, the input devices 134 include touchscreen input controls for at least some of the display devices 132.

The system 120 includes an augmented reality (AR) component 136 that can generate one or more AR objects to images from the cameras 124. In some implementations, the AR component 136 receives input from one or more of the other sensors 126 regarding an obstacle. For example, the AR component 136 generates an AR object that represents the obstacle and indicates a distances thereto.

Figure 2A:
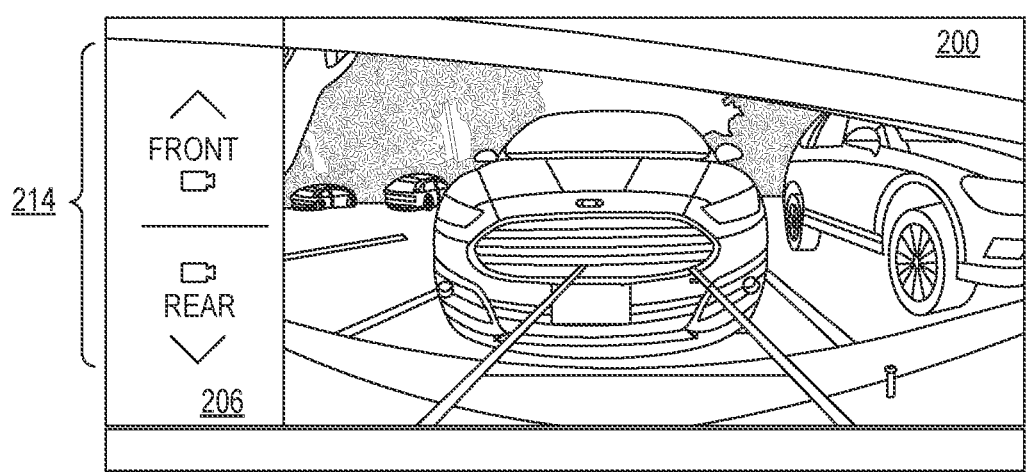
FIGS. 2A-2B show examples relating to an interactive multi-display surrounding-view system.
Figure 2A:
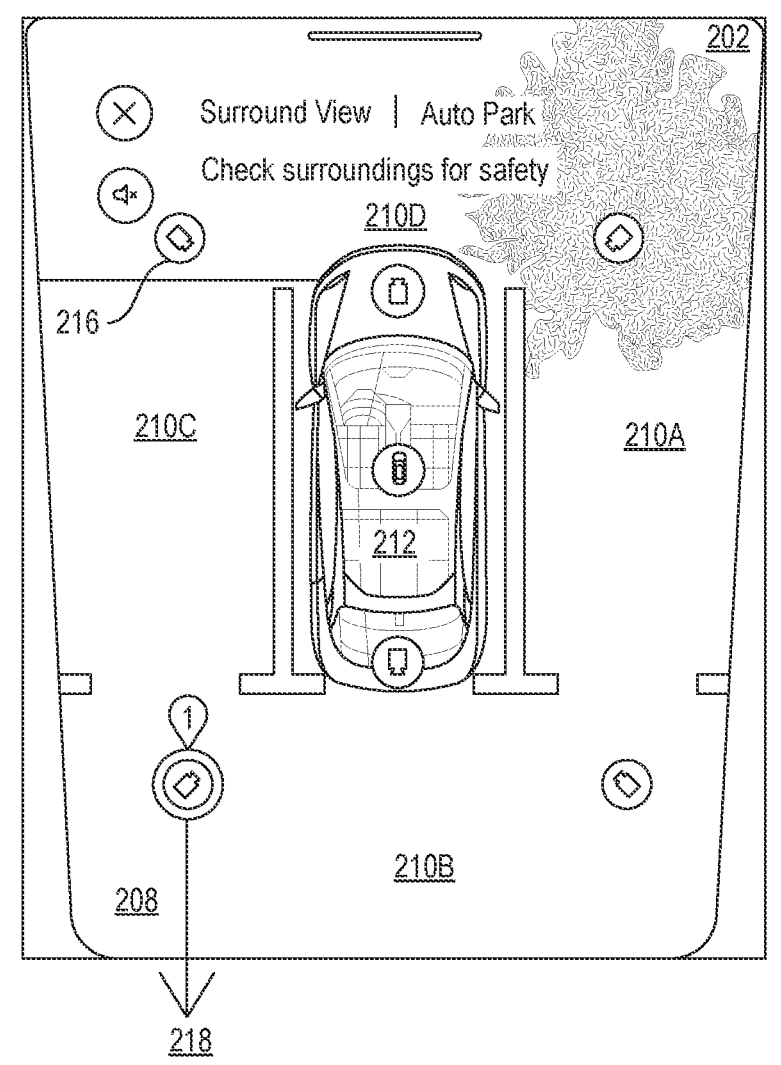
Figure 2B:
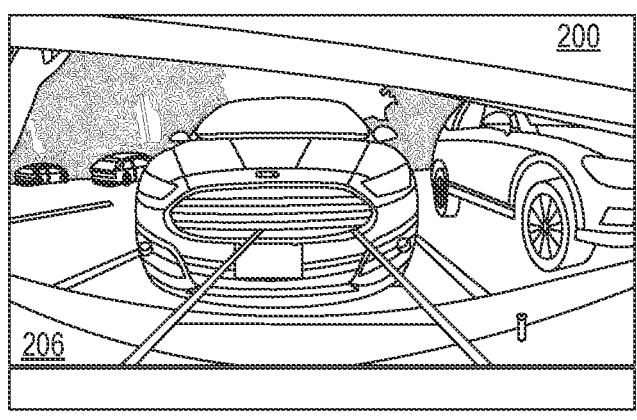
Figure 2B:
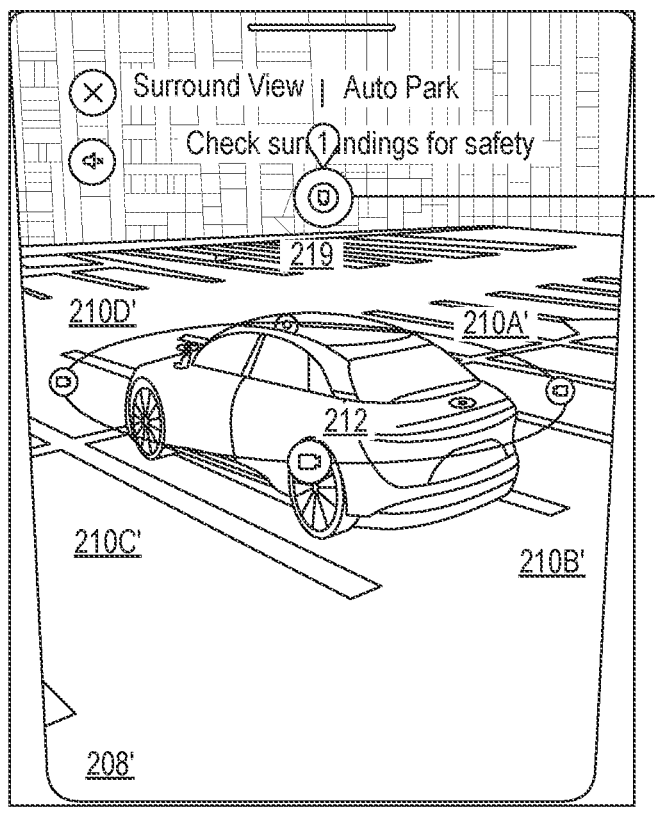

FIGS. 2A-2B show examples relating to an interactive multi-display surrounding-view system. The examples involve a display device 200 (e.g., the display device 110 in FIG. 1A) and a display device 202 (e.g., the display device 112 in FIG. 1A). Each of the display devices 200 or 202 can present one or more images. Here, the display device 200 presents an image 206, and the display device 202 presents an image 208.

The interactive multi-display surrounding-view system (e.g., the system 120 in FIG. 1B) can receive outputs from at least four cameras (e.g., aimed in respective different directions from the vehicle). The image processing component 128 (FIG. 1B) can stitch together the outputs into an image. Here, the image 208 at the display device 202 shows a top-down view of vehicle surroundings including a right side 210A, a rear side 210B, a left side 210C, and a front side 210D. The image processing component 128 can add a three-dimensional (3 D) model 212 of the vehicle to the image 208. In the top-down view, the 3 D model 212 is shown from above.

The image 206 at the display device 200, moreover, comprises one of the outputs from which the image 208 was stitched together. In some implementations, the display device 200 presents a touchscreen input control 214. The touchscreen input control 214 can be used for choosing among (e.g., toggling between) the outputs from the cameras. For example, the image 206 currently presents a rear view of the vehicle.

The interactive multi-display surrounding-view system simultaneously presents the images 206 and 208 in the vehicle. For example, the image 206 is presented at the display device 110 (FIG. 1A) at the same time as the image 208 is presented at the display device 112 (FIG. 1A). This can provide the advantage to the driver of being able to see both a surrounding view (e.g., a construed or composite representation) and a direct view (e.g., an unaltered output from one or the vehicle's cameras) at the same time.

The image 208, which can be referred to as an enhanced image due to at least having been stitched from respective images, and including the 3 D model 212, can include one or more touchscreen controls. Here, the image 208 includes multiple view presets 216. Actuating one of the view presets 216 can trigger the interactive multi-display surrounding-view system to change the image 208, as schematically indicated by an arrow 218.

The image 208 can be changed to an image 208' as shown in FIG. 2B. The image 208' is a perspective view of the vehicle surroundings and the 3 D model 212 of the vehicle. The vehicle surroundings can now reflect a right side 210A', a rear side 210B', a left side 210C', and a front side 210D' of the vehicle. The 3 D model 212 has been rotated into a perspective view.

The image 206 at the display device 200 can be unaffected by the change to the image 208'. This can allow the driver increased awareness of the surroundings of the vehicle, for example when performing a parking maneuver.

The image 208' can include a control 219. In some implementations, the control 219 can allow the user to return to the image 208 as shown in FIG. 2A. For example, the control 219 can be a general "undo" control, or can be configured for invoking a default view.

Figure 3A:
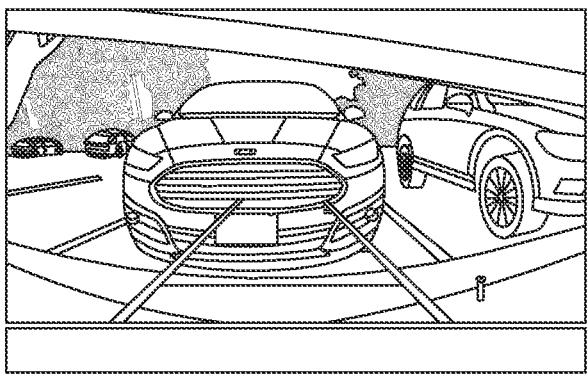
FIGS. 3A-3C show an example relating to panning the screen for moving a camera view.
Figure 3A:
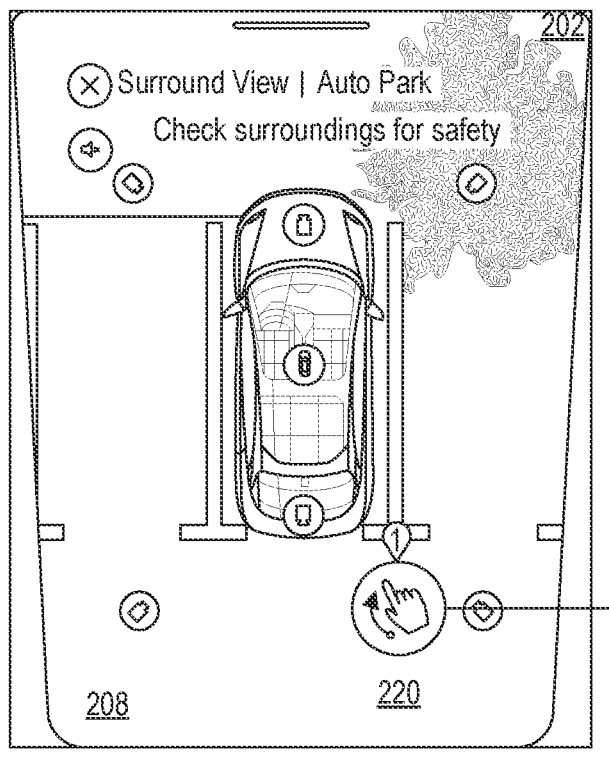
Figure 3B:
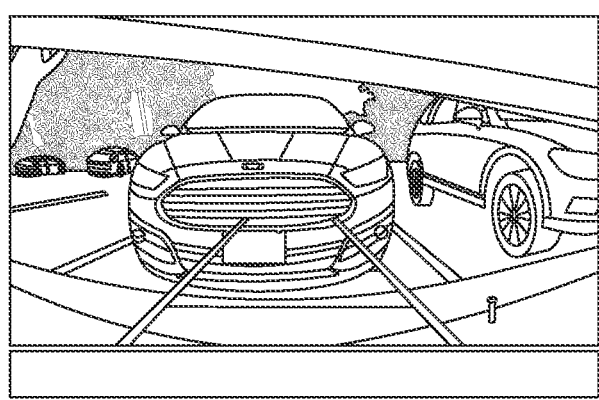
Figure 3B:
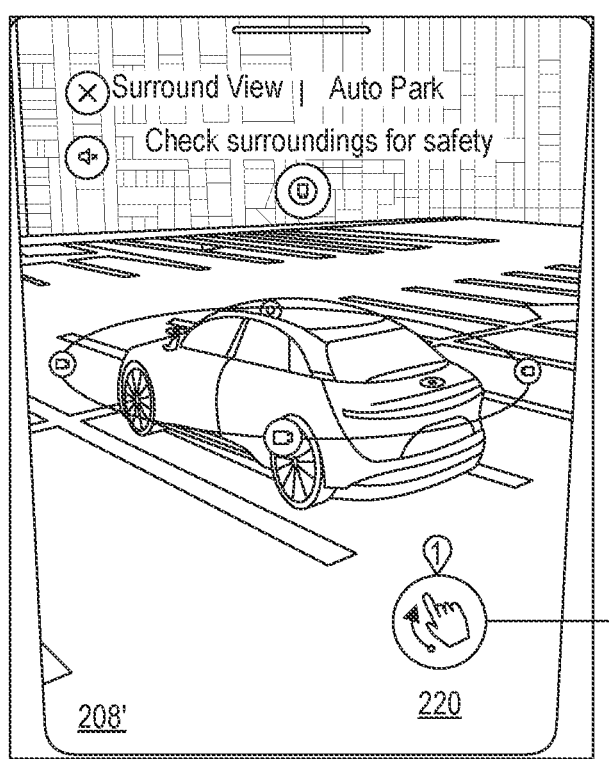
Figure 3C:
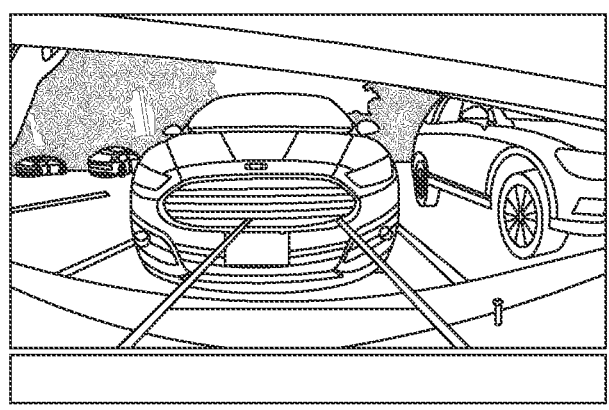
Figure 3C:
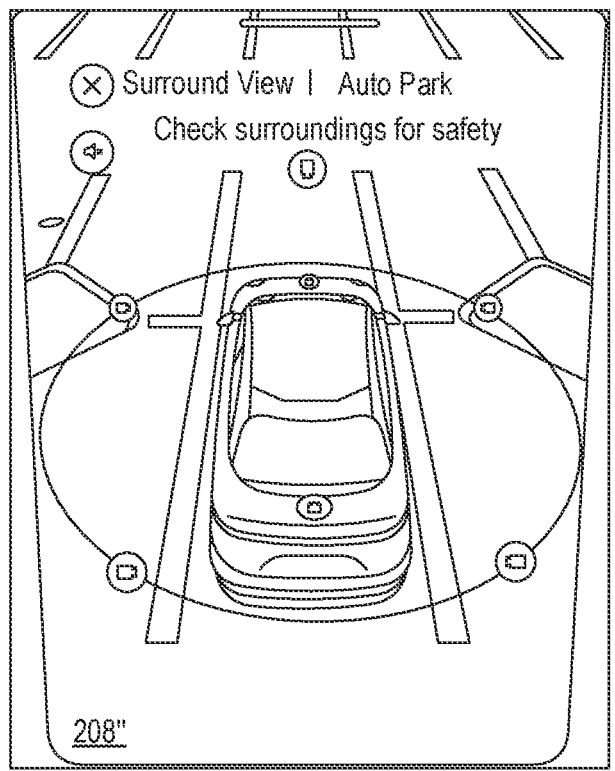

FIGS. 3A-3C show an example relating to panning the screen for moving a camera view. Here, the image 208 at the display device 202 includes a touchscreen input control that can detect a sweeping gesture made with one finger (or a stylus), as schematically indicated by a symbol 220. The symbol 220 may not be visible on the display device 202, and is used here for illustrative purposes.

Upon recognizing the sweeping gesture, the interactive multi-display surrounding-view system can generate the image 208' as shown in FIG. 3B. The symbol 220 here indicates that the user can perform additional sweeping in the image 208'. In some implementations, the user can rotate the image 208' in 3 D so as to change the perspective view into a different perspective view. FIG. 3C shows an image 208" that can be presented. For example, in the image 208" the vehicle surroundings, and the 3 D model 212, have been further rotated by the sweeping gesture.

Figure 4A:
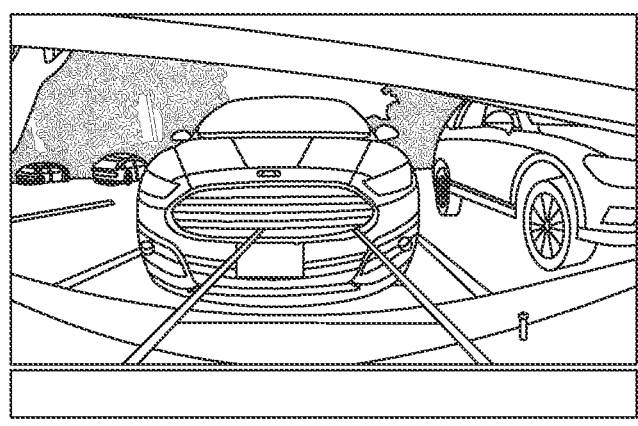
FIGS. 4A-4B show examples relating to zooming a screen of the interactive multi-display surrounding-view system.
Figure 4A:
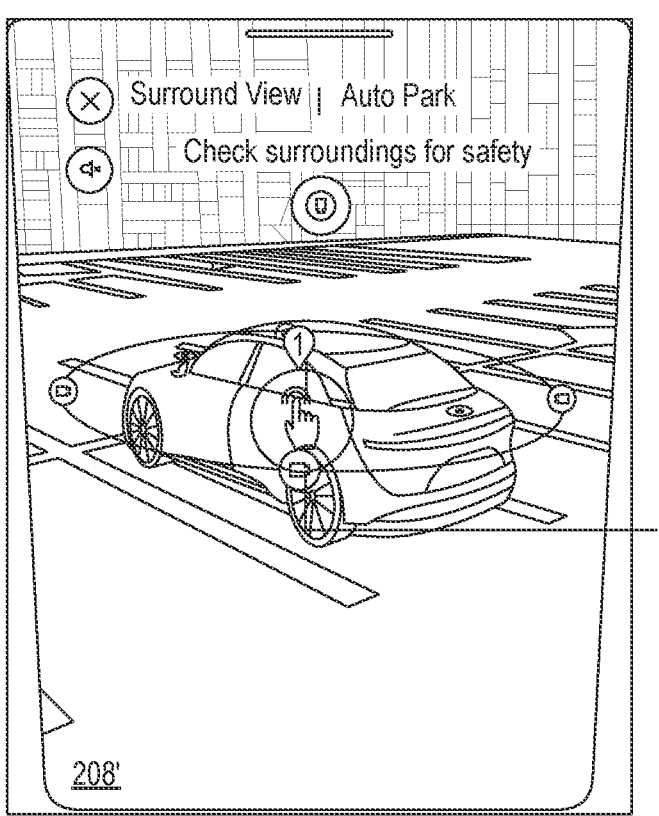
Figure 4B:
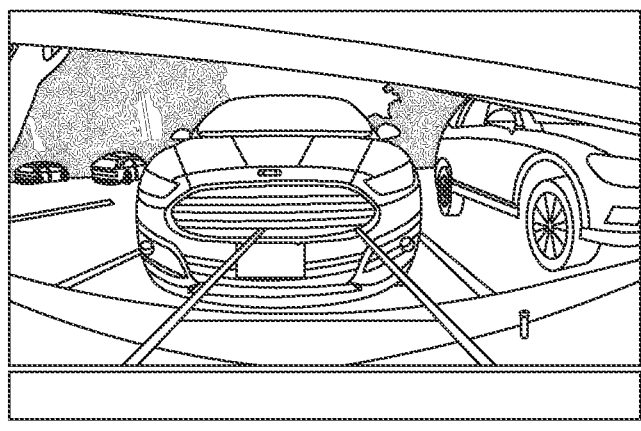
Figure 4B:
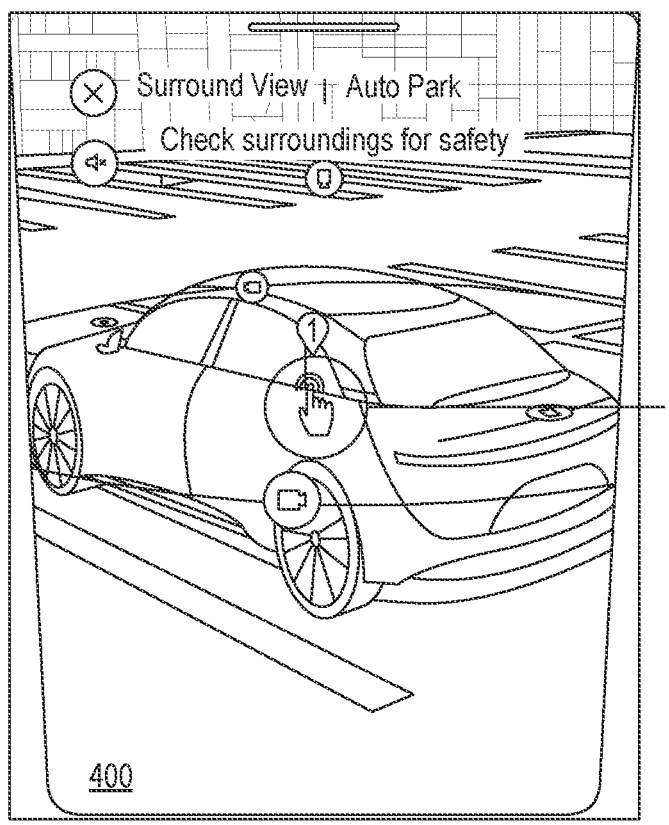

FIGS. 4A-4B show examples relating to zooming a screen of the interactive multi-display surrounding-view system. FIG. 4A shows the image 208 similar to how it was presented in FIG. 2B. One or more operations can be performed to alter the zoom level. FIG. 4B shows that an image 400 is presented that is a zoomed-in version of the image 208'. In some implementations, tapping on the touchscreen input control can trigger the interactive multi-display surrounding-view system to change between the images 208' and 400. For example, double-tapping can trigger a zooming-in operation. In some implementations, a pinch gesture can trigger the interactive multi-display surrounding-view system to change between the images 208' and 400. For example, pinching two fingers together can trigger a zooming-in operation, and vice versa.

Figure 5A:
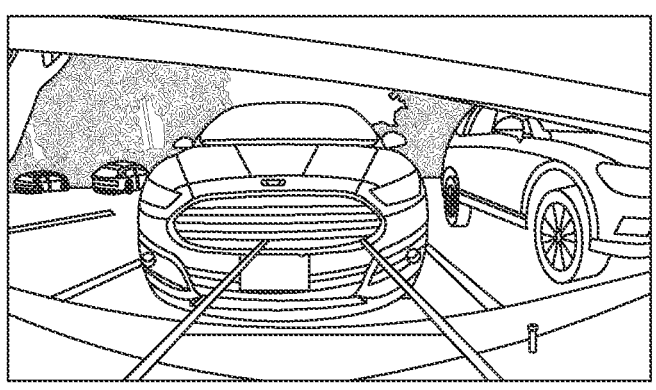
FIGS. 5A-5B show an example relating to performing a gesture to revert the interactive multi-display surrounding-view system to a default view.
Figure 5A:
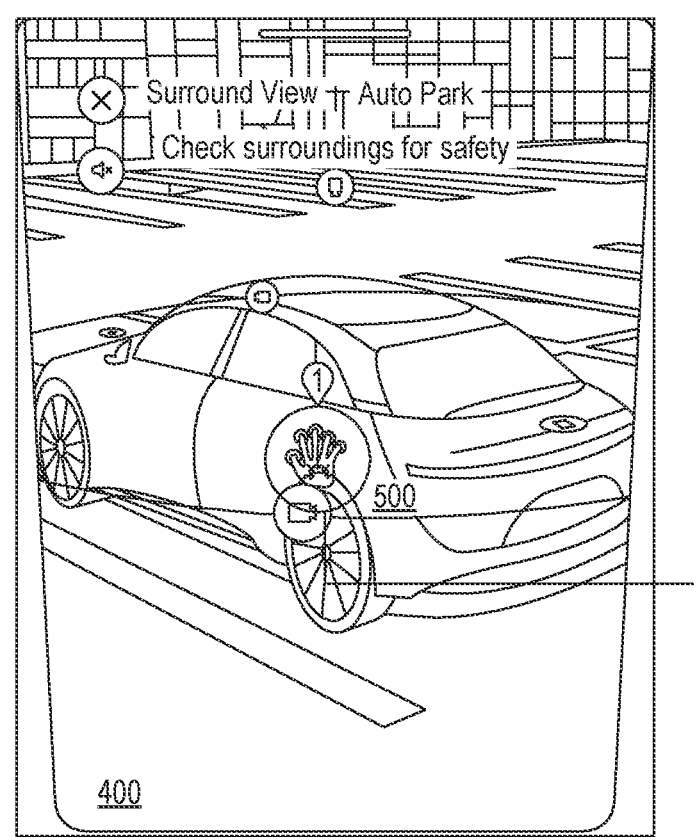
Figure 5B:
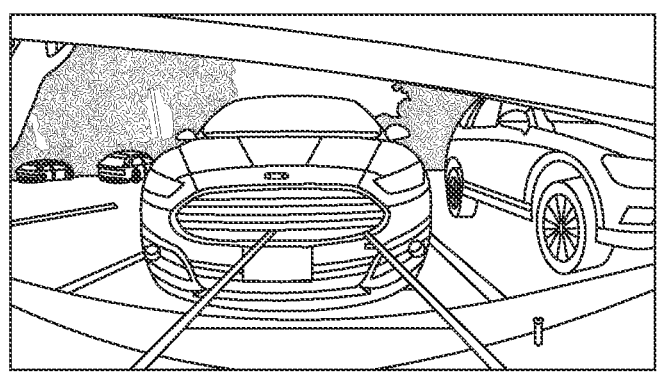
Figure 5B:
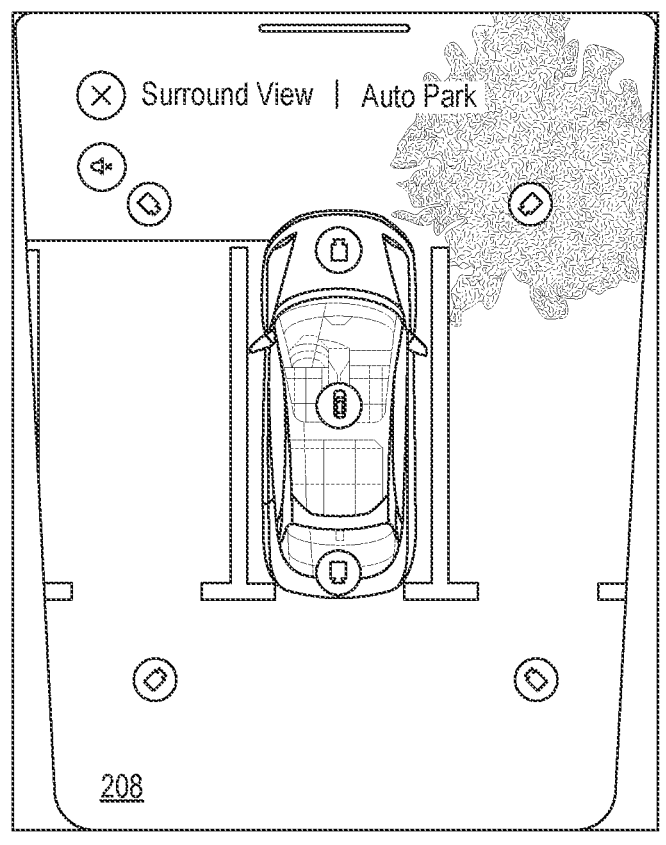

FIGS. 5A-5B show an example relating to performing a gesture to revert the interactive multi-display surrounding-view system to a default view. FIG. 5A shows the image 400 similar to how it was presented in FIG. 4B. One or more operations can be performed to change the presentation on the display device. Here, the image 400 includes a touchscreen input control that can detect a sweeping gesture made with five fingers, as schematically indicated by a symbol 500. The symbol 500 may not be visible on the display device 202, and is used here for illustrative purposes. Upon recognizing the five-finger pinch, the interactive multi-display surrounding-view system can generate the image 208 as shown in FIG. 5B.

FIGS. 6A-6D show examples relating to augmenting views of the interactive multi-display surrounding-view system. The system can receive sensor output regarding presence of an obstacle in the vehicle surroundings. In response, the system can add an AR object to at least one of the display devices 200 or 202. Here, the system adds an AR object 600 to the image of the display device 200, and an AR object 602 to the image of the display device 202. Each of the AR objects 600 and/or 602 represents the detected obstacle, and can have different shapes depending on the detected obstacle. For example, the AR object 600 can represent a vehicle 604 detected by the sensor(s). As another example, the AR object 602 can represent vehicles 606 and 608 detected by the sensor(s). The separation between the AR object 602 and the 3 D model 212 of the vehicle can indicate a distance to the obstacle. The AR object(s) can be placed at one or more sides of the 3 D model 212 of the vehicle.

Figure 6A:
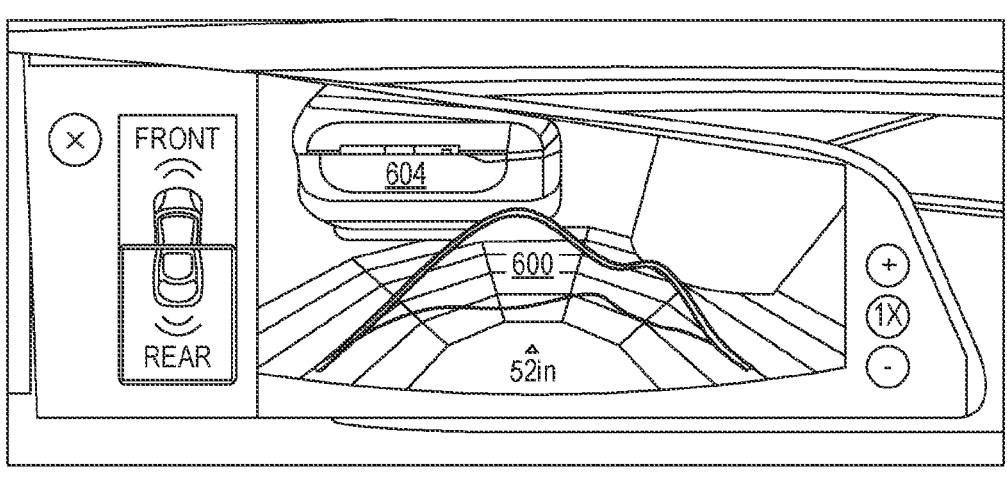
FIGS. 6A-6D show examples relating to augmenting views of the interactive multi-display surrounding-view system.
Figure 6B:
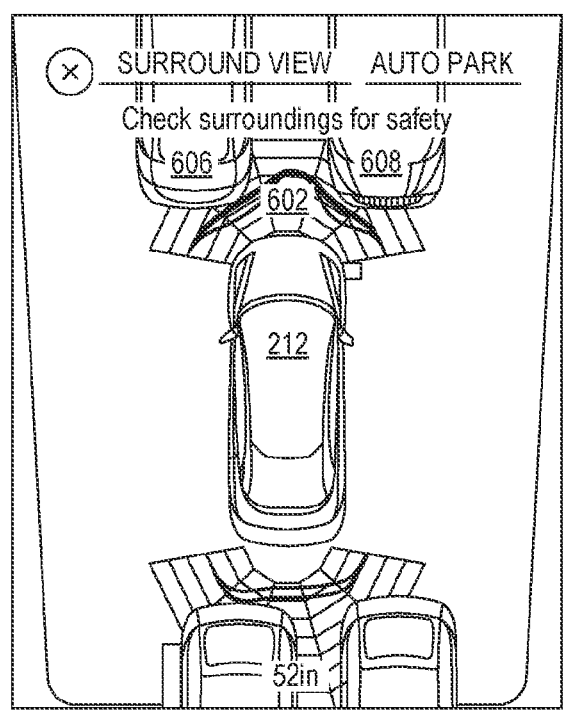
Figure 6C:
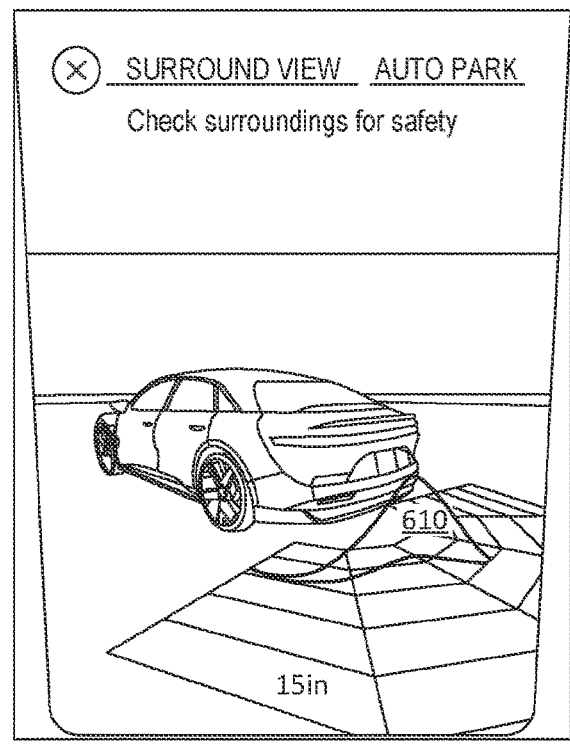
Figure 6D:
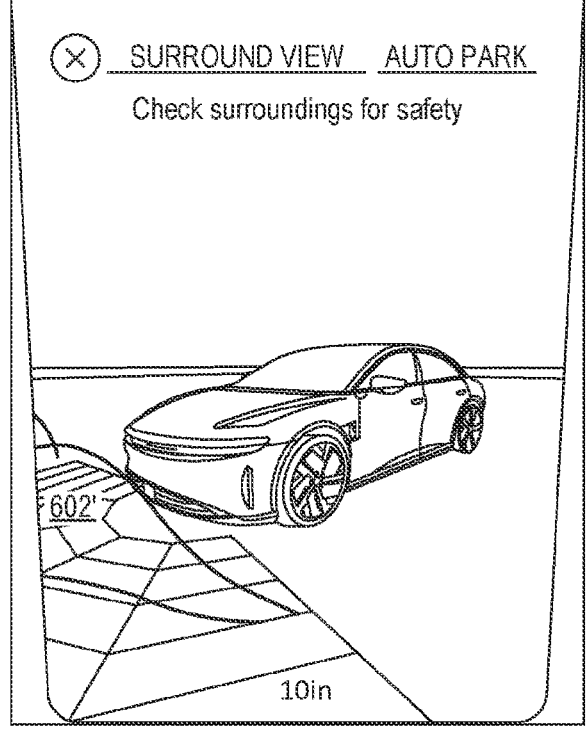

The AR objects 600 and/or 602 can be shown in any of multiple changed views. FIG. 6C shows that the user has change the top-down view into a perspective view (e.g., by way of any of the actuations exemplified above). The display device 202 can then present an AR object 610 that indicates presence of an obstacle relative to the rear of the vehicle. FIG. 6D shows that the user has rotated the view to instead present the front of the vehicle, and an AR object 602' can then correspond to a modification of the AR object 602 (FIG. 6B).

The input devices 134 (FIG. 1B) of the display devices 132 accept inputs simultaneously and non-simultaneously with each other. In some implementations, a touchscreen input control (e.g., any of the functional on-screen features described herein) can be used at the same time as another touchscreen input control, or either of the touchscreen input controls can be used without the other. For example, simultaneous user inputs can be made two or more of the display devices 106, 108, 110, or 112 (FIG. 1A) to change their respective outputs at the same time. This can provide a powerful and flexible tool to a driver wishing to monitor the surroundings of the vehicle.

Figure 7:
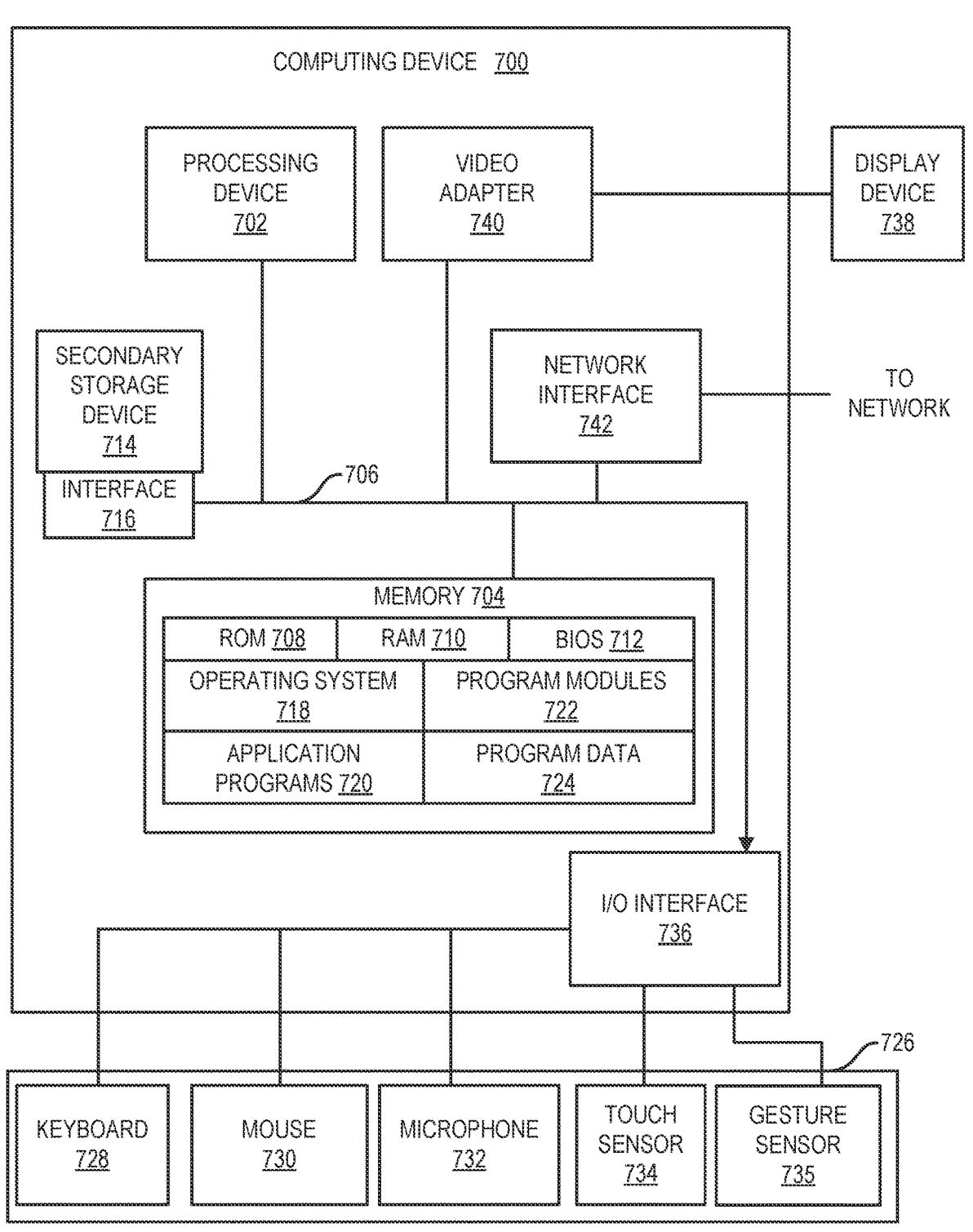
FIG. 7 illustrates an example architecture of a computer system.

FIG. 7 illustrates an example architecture of a computing device 700 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 7 can be used to execute the operating system, application programs, and/or software modules (including the software engines) described herein.

The computing device 700 includes, in some embodiments, at least one processing device 702 (e.g., a processor), such as a central processing unit (CPU). A variety of processing devices are available from a variety of manufacturers, for example, Intel or Advanced Micro Devices. In this example, the computing device 700 also includes a system memory 704, and a system bus 706 that couples various system components including the system memory 704 to the processing device 702. The system bus 706 is one of any number of types of bus structures that can be used, including, but not limited to, a memory bus, or memory controller; a peripheral bus; and a local bus using any of a variety of bus architectures.

Examples of computing devices that can be implemented using the computing device 700 include a desktop computer, a laptop computer, a tablet computer, a mobile computing device (such as a smart phone, a touchpad mobile digital device, or other mobile devices), or other devices configured to process digital instructions.

The system memory 704 includes read only memory 708 and random access memory 710. A basic input/output system 712 containing the basic routines that act to transfer information within computing device 700, such as during start up, can be stored in the read only memory 708.

The computing device 700 also includes a secondary storage device 714 in some embodiments, such as a hard disk drive, for storing digital data. The secondary storage device 714 is connected to the system bus 706 by a secondary storage interface 716. The secondary storage device 714 and its associated computer readable media provide non-volatile and non-transitory storage of computer readable instructions (including application programs and program modules), data structures, and other data for the computing device 700.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 714 and/or system memory 704, including an operating system 718, one or more application programs 720, other program modules 722 (such as the software engines described herein), and program data 724. The computing device 700 can utilize any suitable operating system.

In some embodiments, a user provides inputs to the computing device 700 through one or more input devices 726. Examples of input devices 726 include a keyboard 728, mouse 730, microphone 732 (e.g., for voice and/or other audio input), touch sensor 734 (such as a touchpad or touch sensitive display), and gesture sensor 735 (e.g., for gestural input). In some implementations, the input device(s) 726 provide detection based on presence, proximity, and/or motion. Other embodiments include other input devices 726. The input devices can be connected to the processing device 702 through an input/output interface 736 that is coupled to the system bus 706. These input devices 726 can be connected by any number of input/output interfaces, such as a parallel port, serial port, game port, or a universal serial bus. Wireless communication between input devices 726 and the input/output interface 736 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 738, such as a monitor, liquid crystal display device, light-emitting diode display device, projector, or touch sensitive display device, is also connected to the system bus 706 via an interface, such as a video adapter 740. In addition to the display device 738, the computing device 700 can include various other peripheral devices (not shown), such as speakers or a printer.

The computing device 700 can be connected to one or more networks through a network interface 742. The network interface 742 can provide for wired and/or wireless communication. In some implementations, the network interface 742 can include one or more antennas for transmitting and/or receiving wireless signals. When used in a local area networking environment or a wide area networking environment (such as the Internet), the network interface 742 can include an Ethernet interface. Other possible embodiments use other communication devices. For example, some embodiments of the computing device 700 include a modem for communicating across the network.

The computing device 700 can include at least some form of computer readable media. Computer readable media includes any available media that can be accessed by the computing device 700. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 700.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 700 can be characterized as an ADAS computer. For example, the computing device 700 can include one or more components sometimes used for processing tasks that occur in the field of artificial intelligence (AI). The computing device 700 then includes sufficient proceeding power and necessary support architecture for the demands of ADAS or AI in general. For example, the processing device 702 can include a multicore architecture. As another example, the computing device 700 can include one or more co-processors in addition to, or as part of, the processing device 702. In some implementations, at least one hardware accelerator can be coupled to the system bus 706. For example, a graphics processing unit can be used. In some implementations, the computing device 700 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-based method of managing camera outputs in an interactive multi-display surrounding view system, the method comprising:

receiving, in an interactive multi-display surrounding-view system of a vehicle, outputs from at least four cameras of the vehicle;

stitching together the outputs into a first image that shows a top-down view of vehicle surroundings;

adding a three-dimensional (3D) model of the vehicle to the first image, based on the vehicle surroundings, to generate a first enhanced image; and simultaneously presenting a plurality of images using a plurality of display devices, wherein: (i) the first enhanced image of the plurality of images is presented on a first display device of the vehicle, the first display device providing a first touchscreen input control for changing the first enhanced image to a different surrounding view, and (ii) a second image of the plurality of images is presented on a second display device positioned separate from the first display device, the second image comprising an unaltered output of one of the outputs from the at least four cameras, the second display device providing a second touchscreen input control to toggle between the outputs at least while changing the first enhanced image to the different surrounding view on the first display device, wherein the first and second touchscreen input controls accept separate inputs simultaneously and non-simultaneously with each other.

2. The computer-based method of claim 1, further comprising receiving a first input made with the first touchscreen input control, and in response changing the first enhanced image from the top-down view to a perspective view of the vehicle surroundings and the 3D model of the vehicle.

3. The computer-based method of claim 2, wherein the first input is made using a sweeping gesture detected by the first touchscreen input control.

4. The computer-based method of claim 2, wherein the first enhanced image presents multiple view presets, and wherein the first input involves the first touchscreen input control detecting a tap on one of the multiple view presets.

5. The computer-based method of claim 2, wherein the top-down view is a default view of the first enhanced image in the interactive multi-display surrounding-view system, the method further comprising receiving a second input made with the first touchscreen input control, and in response again presenting the default view on the first display device.

6. The computer-based method of claim 5, wherein the second input includes a five-finger pinch detected by the first touchscreen input control.

7. The computer-based method of claim 1, further comprising receiving an input made with the first touchscreen input control, and in response changing a zoom level of the first enhanced image.

8. The computer-based method of claim 7, wherein the input includes a double tap detected by the first touchscreen input control.

9. The computer-based method of claim 7, wherein the input includes a pinch gesture detected by the first touchscreen input control.

10. The computer-based method of claim 1, further comprising receiving an input made with the second touchscreen input control, and in response changing the second image to comprise another one of the outputs.

11. The computer-based method of claim 1, further comprising receiving, in the interactive multi-display surrounding-view system, sensor output regarding presence of an obstacle in the vehicle surroundings, and in response (i) adding a first augmented reality (AR) object to the first enhanced image, and (ii) adding a second AR object to the second image, each of the first and second AR objects representing, and indicating a distance to, the obstacle.

12. The computer-based method of claim 11, further comprising receiving input made with the first touchscreen input control, and in response rotating the top-down view into a perspective view of the vehicle surroundings and the 3D model of the vehicle, including modifying the first AR object in the first enhanced image.

13. The computer-based method of claim 11, further comprising receiving input made with the second touchscreen input control, and in response changing the second image to comprise another one of the outputs, including modifying the second AR object in the second image.

\* \* \* \* \*